US007533590B2

(12) United States Patent
Cirio

(10) Patent No.: US 7,533,590 B2
(45) Date of Patent: May 19, 2009

(54) SCREWING AND ROLLING HEAD FOR THE APPLICATION OF PRE-THREADED CAPS

(75) Inventor: Sergio Cirio, Canelli (IT)

(73) Assignee: Arol S.p.A., Canelli (ASTI) (IT)

( * ) Notice: Subject to any disclaimer, the term of this patent is extended or adjusted under 35 U.S.C. 154(b) by 180 days.

(21) Appl. No.: 11/734,696

(22) Filed: Apr. 12, 2007

(65) Prior Publication Data

US 2008/0078146 A1 Apr. 3, 2008

(30) Foreign Application Priority Data

Oct. 2, 2006 (IT) .......................... TO2006A0706

(51) Int. Cl.
*F16H 27/02* (2006.01)

(52) U.S. Cl. .......................... 74/89.23; 53/287; 53/325

(58) Field of Classification Search ................ 74/89.23; 53/285, 287, 314, 324, 325
See application file for complete search history.

(56) References Cited

U.S. PATENT DOCUMENTS 3,076,300 A 2/1963 Luedi et al.
3,878,667 A * 4/1975 Holstein ...................... 53/340
3,895,478 A * 7/1975 Friendship ..................... 53/77
4,295,320 A * 10/1981 Willingham ................. 53/201
4,322,186 A * 3/1982 Boling ....................... 408/139
4,939,890 A * 7/1990 Peronek et al. ............... 53/486

FOREIGN PATENT DOCUMENTS

EP 0 248 145 2/1987
EP 1519891 3/2006

OTHER PUBLICATIONS

EP Search Report, Application No. 07103549.7-1261, dated Dec. 28, 2007.

* cited by examiner

*Primary Examiner*—David M Fenstermacher
(74) *Attorney, Agent, or Firm*—Patterson & Sheridan, LLP

(57) ABSTRACT

Screwing and rolling head for the application of pre-threaded caps on containers, comprising a first support, designed to be moved with a helical motion, a second support, which is mobile with respect to the first support in a longitudinal direction and is fixed in rotation with respect to the first support, a device for screwing caps, fixed in an axial direction with respect to the second support and rotatable with respect to the second support, a torque-limiter device, connected between the screwing device and the second support, and at least one oscillating arm, which carries a rolling element and is articulated to the second support about a transverse axis. The device for screwing caps comprises a gripper, which is mobile between an open position and a closed position and is designed to grip a cap along a side wall thereof, the movements of opening and closing of the gripper being controlled by a control rod, which is mobile in an axial direction.

11 Claims, 6 Drawing Sheets

SCREWING AND ROLLING HEAD FOR THE APPLICATION OF PRE-THREADED CAPS

CROSS-REFERENCE TO RELATED APPLICATIONS

This application claims benefit of Italian patent application number TO2006A000706, filed Oct. 2, 2006, which is herein incorporated by reference.

BACKGROUND OF THE INVENTION

1. Field of the Invention

The present invention relates to a screwing and rolling head for the application of pre-threaded caps on containers with threaded necks.

2. Description of the Related Art

Pre-threaded caps for bottles have a cylindrical wall made of deformable metal material, for example, aluminium or the like, which is subjected to an operation of cold plastic deformation by means of rolling after screwing of the cap on the neck of the container. This rolling operation deforms an annular portion of the side wall of the cap against an annular groove provided on the neck of the container at the base of the thread.

SUMMARY OF THE INVENTION

The present invention relates to a head designed to carry out, in combination, the operations of screwing and rolling. Known from the document No. EP-A-1 519 891 is a combined screwing and rolling head. In the solution known from this document, the member that carries out screwing of the caps on the neck of the container operates by friction on a top surface of the cap. The application of the gripping torque to the caps by friction risks damaging the top surface of the caps. In particular, a screwing and rolling head of a known type risks damaging the wordings and images impressed on the top surface of the caps.

The purpose of the present invention is to provide a combined screwing and rolling head for the application of pre-threaded caps that will overcome the drawbacks of the known art.

BRIEF DESCRIPTION OF THE DRAWINGS

The characteristics and advantages of the head according to the present invention will emerge clearly evident in the course of the ensuing detailed description, provided purely by way of non-limiting example, with reference to the attached drawings, in which.

DETAILED DESCRIPTION

Figure 1:
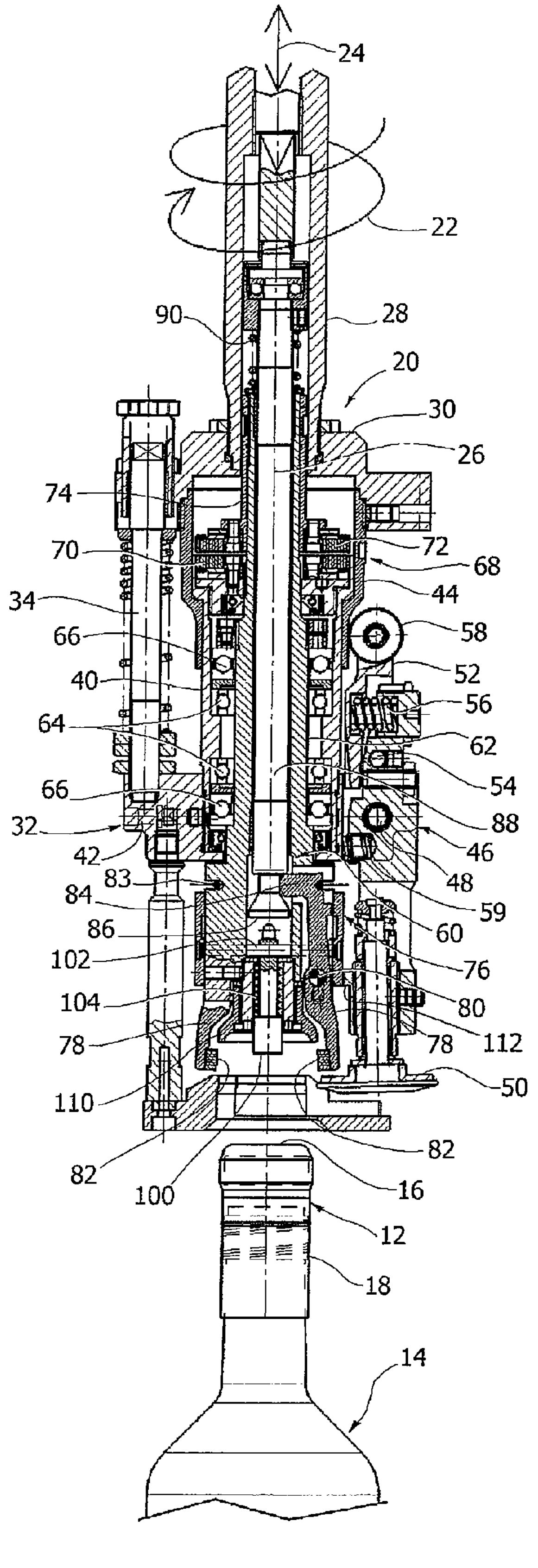
FIG. 1 is an axial cross section of a screwing and rolling head according to the present invention.
Figure 2A:
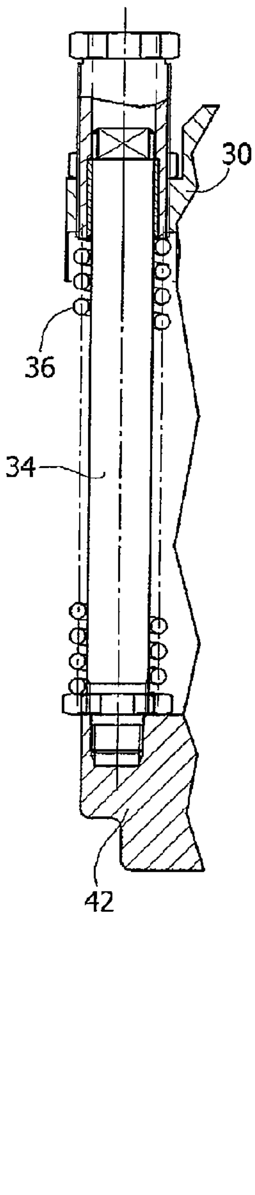
FIG. 2*a* is a detail of a part of the head not visible in the plane of representation of FIG. 2.
Figure 2:
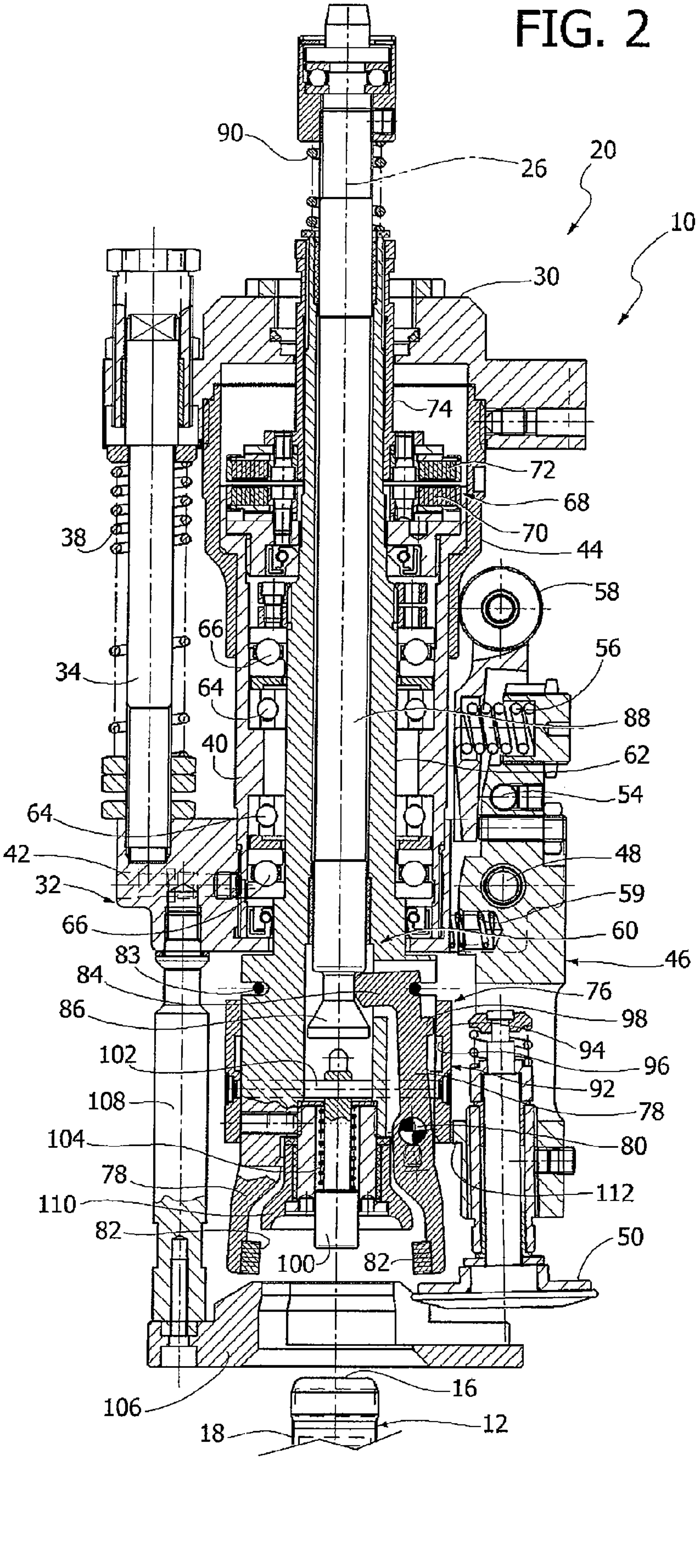
FIG. 2 is an axial cross section, at an enlarged scale, of the head of FIG. 1.

With reference to FIGS. 1 and 2, the number 10 designates a screwing and rolling head according to the present invention. The head 10 is designed to apply pre-threaded caps 12 on containers 14 (in the example illustrated, constituted by bottles) having a threaded neck. The pre-threaded caps 12 are of a type in itself known. Said caps comprise a plane top surface 16 and a substantially cylindrical side surface 18. The caps 12 comprise an external skirt formed by a thin layer made of plastically deformable metal material and a threaded internal insert that couples with the thread provided on the neck of the container 14. Pre-threaded caps of this type are also provided with a disk-shaped compliant gasket situated within the metal skirt underneath the top surface 16. Said gasket is designed to be pressed against the front edge of the neck of the container 14.

The screwing and rolling head 10 comprises a first support 20 having a helical motion represented by the arrow 22 in FIG. 1. The helical motion of the first support 20 is made up of a rectilinear movement in the direction of the longitudinal axis 26 of the head 10, represented by the double-headed arrow 24, and a rotary movement about the longitudinal axis 26. The first support 20 comprises a tubular spindle 28, which is connected to actuation means (not illustrated), designed to impart the helical motion on the first support 20. The actuation means are not described in so far as they do not fall within the scope of the present invention. Said actuation means can be obtained in any way known in the sector of capping machines designed to apply threaded tops. The bottom end of the spindle 28 is fixed to a first flange 30, which extends in a radial direction outwards with respect to the spindle 28.

The head 10 comprises a second support 32, which is mobile with respect to the first support 20 in the direction of the longitudinal axis 26 and is fixed in rotation with respect to the first support 20. This means that the second support 32 as regards the rotary movements about the axis 26 is fixed with respect to the first support 20 whilst it is free to perform a displacement in the direction of the axis 26 with respect to the first support 20. The connection between the first support 20 and the second support 32 is obtained by means of a plurality of guide rods 34 that extend parallel to the longitudinal axis 26. Each guide rod 34 has a bottom end fixed to the second support 32 and a top end that engages so that it can slide in a hole provided in the flange 30 of the first support 20. The head 10 comprises a plurality of guide rods 34 set at a distance from one another in a circumferential direction. Visible in the representations appearing in the figures is just one of the guide rods 34. There may, for example, be provided four guide rods 34 set at an angular distance from one another of 90° C.

Elastic compression means are arranged between the first support 20 and the second support 32, tending to push the second support 32 away from the first support 20. With reference to FIGS. 2 and 2*a*, said elastic means are obtained in the form of helical compression springs 36, 38 arranged coaxially with respect to respective guide rods 34. A first series of springs 36 (FIG. 2*a*) apply a force of relatively low intensity. A second series of springs 38 (FIG. 2) apply a force of relatively high intensity. The second series of springs 38 goes into action and generates the force of relatively high intensity only after a travel of the second support 32 with respect to the first support 20 that is greater than a pre-set threshold. When the relative movement in an axial direction of the second support 32 with respect to the first support 20 is smaller than said threshold, the second support 32 is subjected to just the force produced by the springs 36 (force of low intensity). When the axial travel of the second support 32 with respect to the first support 20 exceeds said threshold, the second support 32 is subjected to a force given by the sum of the elastic forces produced by the springs 36 and 38. For instance, the force of low intensity produced by the springs 36 can be in the region of 15 kg whilst the force of high intensity produced by the springs 36 and 38 can be in the region of 50 kg. The second support 32 is subjected to the force of low intensity for an initial travel of 3-4 mm and is subsequently subjected to the force of high intensity for a travel of approximately 12 mm. As will be described in what follows, the first travel serves to carry out screwing of the cap, and the second travel serves to carry out rolling of the cap.

The second support 32 comprises a tubular sleeve 40 and a flange 42 fixed to the tubular sleeve 40 and projecting from the latter in a radial direction outwards. The guide rods 34 are fixed to the flange 42 of the second support 32. The tubular sleeve 40 extends coaxially with respect to the longitudinal axis 26 of the head 10, in the direction of the first support 20. The first support 20 carries a cam 44 fixed with respect to the flange 30. The cam 44 extends towards the second support 32 and has a bottom end that is in sliding contact with the top end of the tubular sleeve 40.

The shoulders present both in the sleeve 40 and in the cam 44 limit the maximum displacement between the first support 20 and the second support 32, in the direction of the axis 26.

The flange 42 of the second support 32 carries at least one oscillating arm 46 articulated about a transverse axis 48. The oscillating arm 46 is mobile between an inoperative position and an operative position and carries at its bottom end an idle rolling disk 50, designed to carry out rolling of the side wall 18 of the cap 12. The oscillating arm 46 comprises an extension 52 articulated about a secondary axis 54 and co-operating with a compression spring 56. The extension 52 of the oscillating arm 46 carries an idle wheel 58, which co-operates with the cam 44 of the first support 20. A compression spring 59 tends to push the oscillating arm 46 towards its inoperative position. The wheel 58 of the oscillating arm 56 is constantly kept in contact with the cam 44 by the action of the springs 56 and 59. The head 10 is preferably provided with two or more oscillating arms 46, set at equal distances from one another in a circumferential direction and provided with respective rolling wheels 50. The various oscillating arms 46 all co-operate with the same cam 44.

The head 10 comprises a device for screwing caps 60 comprising a tubular shaft 62 coaxial with respect to the longitudinal axis 26 of the head 10. The tubular shaft 62 is fixed in an axial direction with respect to the second support 32 and is supported in a rotatable way about the axis 26 by the tubular sleeve 40 of the second support 32. In the embodiment illustrated in the figures, the tubular shaft 62 is carried by the tubular sleeve 40 by means of a pair of radial bearings 64 and a pair of axial bearings 66. The tubular shaft 62 is connected in rotation to the second support 32 by means of a torque-limiter device 68. In the example illustrated in the figures, the torque-limiter device 68 is constituted by a magnetic clutch including two rings 70, 72, magnetically coupled to one another. A first ring 70 is fixed with respect to the tubular sleeve 40 of the second support 32, and the second ring 72 is fixed with respect to the tubular shaft 62. A ring nut 74, screwed on a threaded portion of the tubular shaft 62, enables adjustment of the axial play between the two rings 70, 72 in order to vary the threshold of intervention of the torque-limiter device 68. Below a pre-set threshold of torque (the value of which is adjustable by means of the ring nut 74) the shaft 62 is fixed in rotation with respect to the second support 32. When the torque transmitted between the second support 32 and the tubular shaft 62 exceeds the threshold of intervention of the torque-limiter device 68, the tubular shaft 62 is free to rotate with respect to the second support 32.

The device for screwing caps 60 comprises a gripper 76 set at the bottom end of the tubular shaft 62. The gripper 76 comprises a plurality of rocker arms 78, articulated about respective transverse axes 80 at the bottom end of the tubular shaft 62. The rocker arms 78, for instance three in number, carry at their bottom end blocks 82 made of elastomeric material having the shape of cylindrical sectors with a circumference equal to the external circumference of the cap 12. The rocker arms 78, forming as a whole the gripper 76, are mobile between an open position and a closed position. The top ends of the rocker arms 78 have respective radial appendages 84, which co-operate with a cam portion 86 provided at the bottom end with a control rod 88. The control rod 88 is housed coaxially within the tubular shaft 62 and can slide with respect to the tubular shaft 62 in the direction of the longitudinal axis 26.

An annular spring 83 keeps the radial appendages 84 of the arms in contact with the cam portion 86.

The top end of the control rod 88 co-operates with an actuation cam (not illustrated). A helical compression spring 90 constantly tends to push the control rod 88 upwards; for this reason, the gripper is normally closed. The cam associated to the control rod 88 pushes the control rod downwards against the action of the spring 90, causing opening of the gripper in pre-set steps of the operating cycle of the capping machine.

The gripper 76 is associated to a safety device 92, which prevents closing of the gripper in the absence of the cap 12 on the container 14. The safety device 92 comprises a ring 94 that surrounds the external side of the rocker arms 78. The ring 94 is mobile in the direction of the longitudinal axis 26 of the head 10 between a lowered position and a raised position. The ring 94 has an annular groove 96, which, in the raised position of the ring 94, is designed to receive protuberances 98 formed on the external side of the rocker arms 78. The safety device 92 comprises a central feeler pin 100 fixed to the ring 94 by means of a transverse pin 102. The feeler pin 100 is pushed downwards by a spring 104 having a force of low intensity.

The head 10 comprises a centering member 106, fixed to the second support 32 by means of a series of axial columns 108. A resting element 110, idle with respect to the tubular shaft 62, is fixed to the bottom end of the tubular shaft 62 and is set on the inside with respect to the oscillating arms 78 forming the gripper 76.

Operation of the head 10 according to the present invention is described in what follows.

The container 12 positions itself underneath the head 10 with the cap 12 inserted on the neck of the container but not yet screwed. Initially, the head 10 is in the configuration illustrated in FIG. 2. In this configuration, the gripper 10 is in the open position, the second support 32 is at the maximum distance from the first support 20, and the arms 46 which carry the rolling wheels 50 are in their inoperative position (position divaricated outwards).

Starting from the above configuration, the first support 20 is moved downwards with helical motion. In this first step, the second support 32 moves in a fixed way with respect to the first support 20. The tubular shaft 62 is fixed with respect to the second support 32 by means of the torque-limiter device 68.

Figure 3:
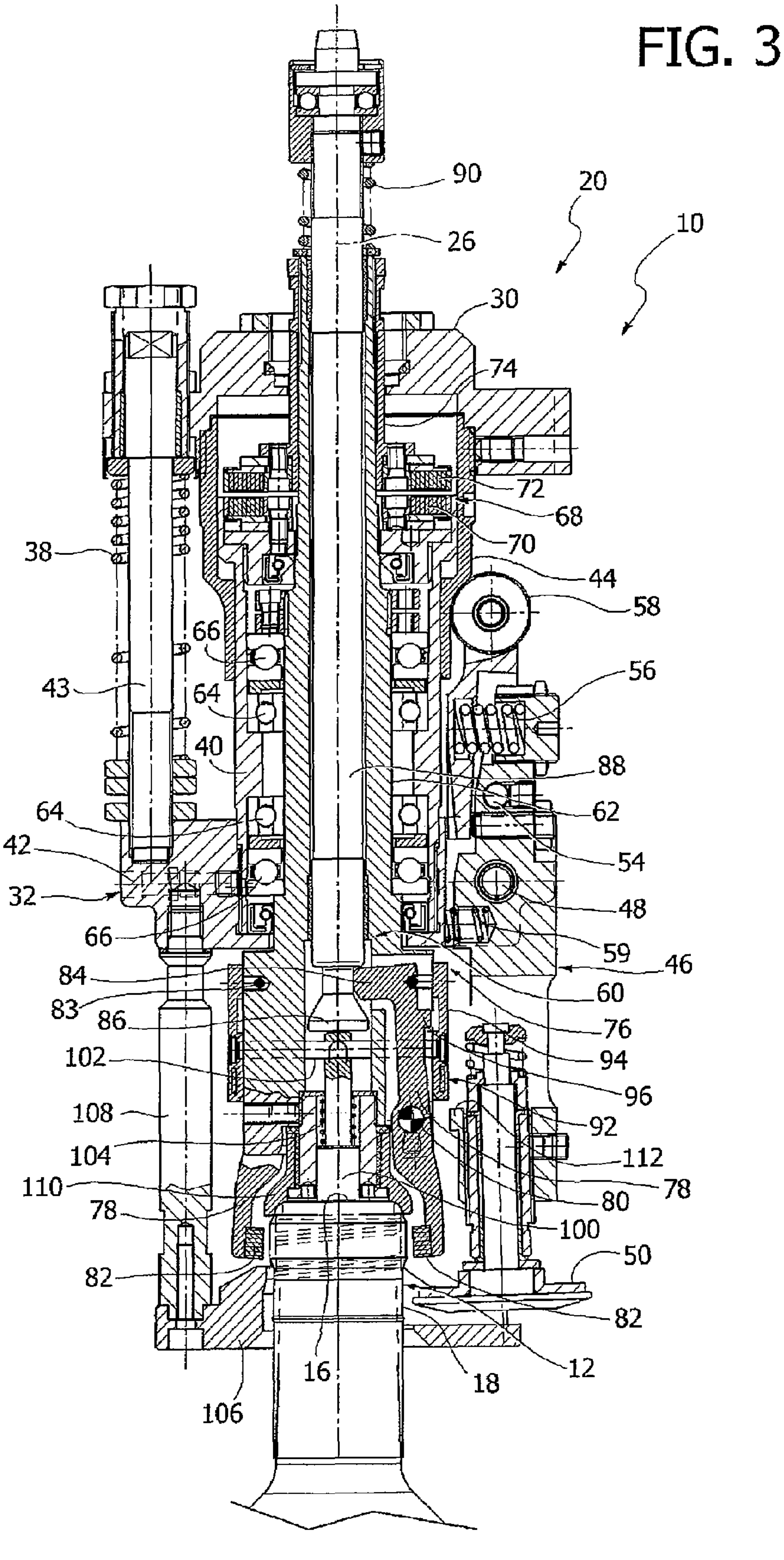
FIGS. 3, 4, 5 and 6 illustrate the sequence of operations of the head according to the present invention.

FIG. 3 shows the step in which the head 10 approaches the cap 12. The resting element 110 rests against the top end of the cap 12. The top surface 16 of the cap 12 pushes the feeler pin 100 upwards against the action of the spring 104. The movement upwards of the feeler pin 100 pushes the ring 94 upwards. In the raised position, the annular groove 96 of the ring 94 is in a position corresponding to the external protuberances 98 of the arms 78 of the gripper 76. In this position, the gripper can be closed. The safety device 76 has the purpose of preventing closing of the gripper if a cap 12 is not present on the container 14. In fact, in the absence of the cap 12, the feeler pin 100 is not pushed upwards, and the protuberances 98 of the arms 78 encounter the internal surface of the ring, which prevents the movement of closing of the gripper.

Figure 4:
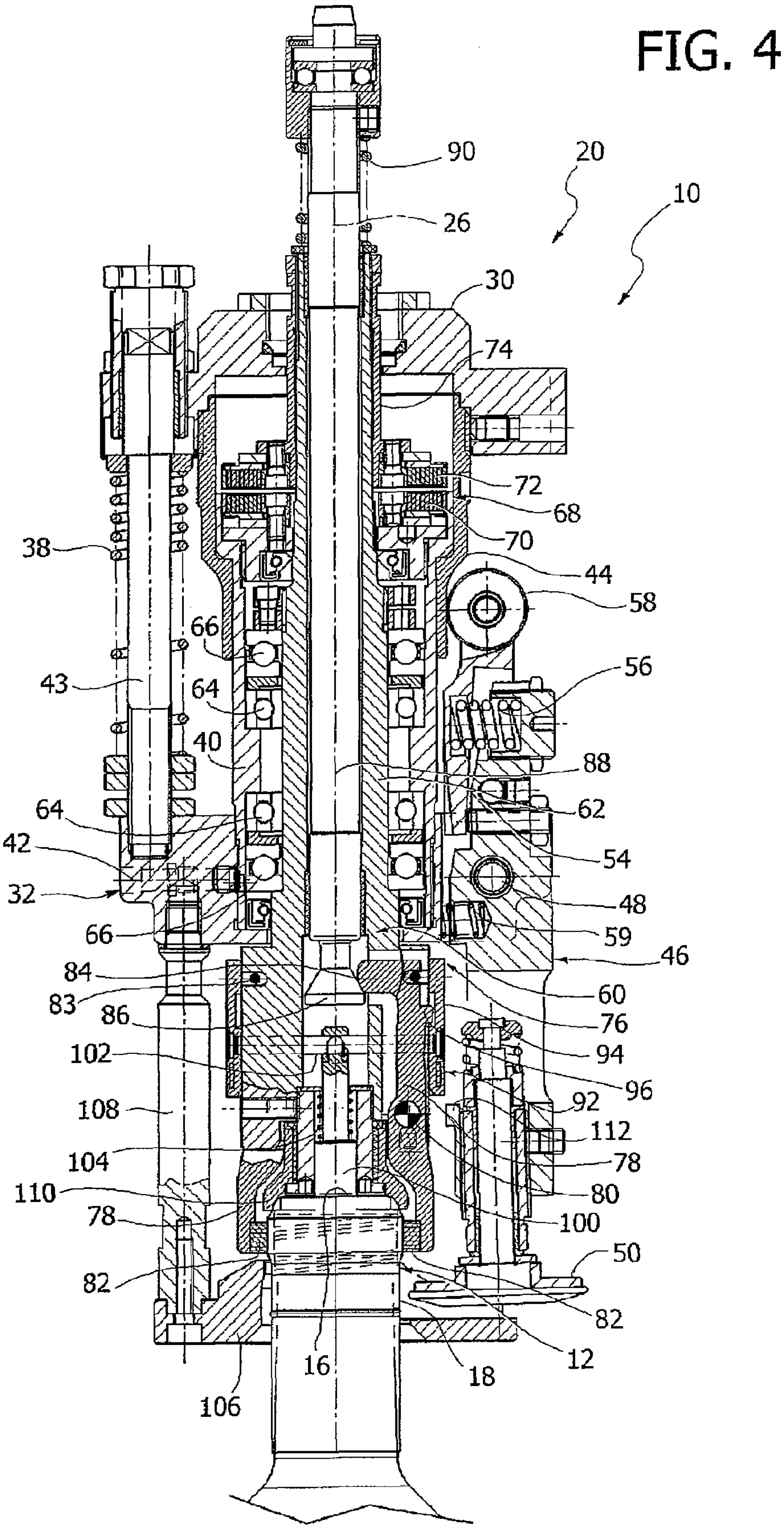

At this point, as illustrated in FIG. 4, the cam that pushes the control rod 88 downwards is raised so that the control rod 88 displaces upwards under the action of the spring 90. The movement upwards of the control rod 88 controls closing of the gripper 76. The blocks 82 of the gripper 76 grip a part of the external surface of the cap 12.

Figure 6:
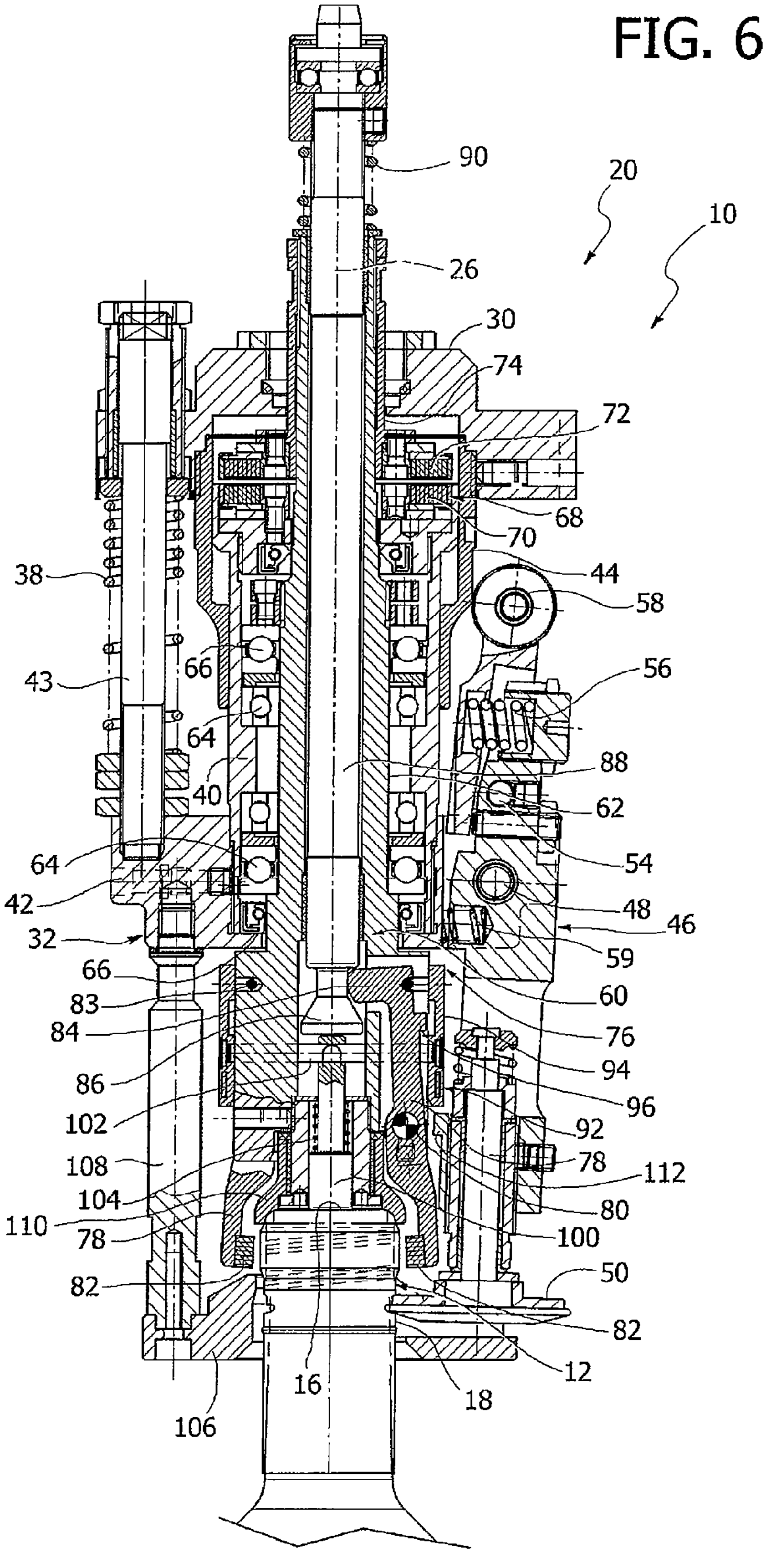

The head 10 then carries out screwing of the cap 12 on the container 14. During the step of screwing, the gripper 76 is pushed downwards by an elastic force of low intensity, provided only by the springs 36, which act between the first support 20 and the second support 32. At the end of screwing, the cam associated to the control rod 88 controls opening of the gripper (FIG. 6).

Figure 5:
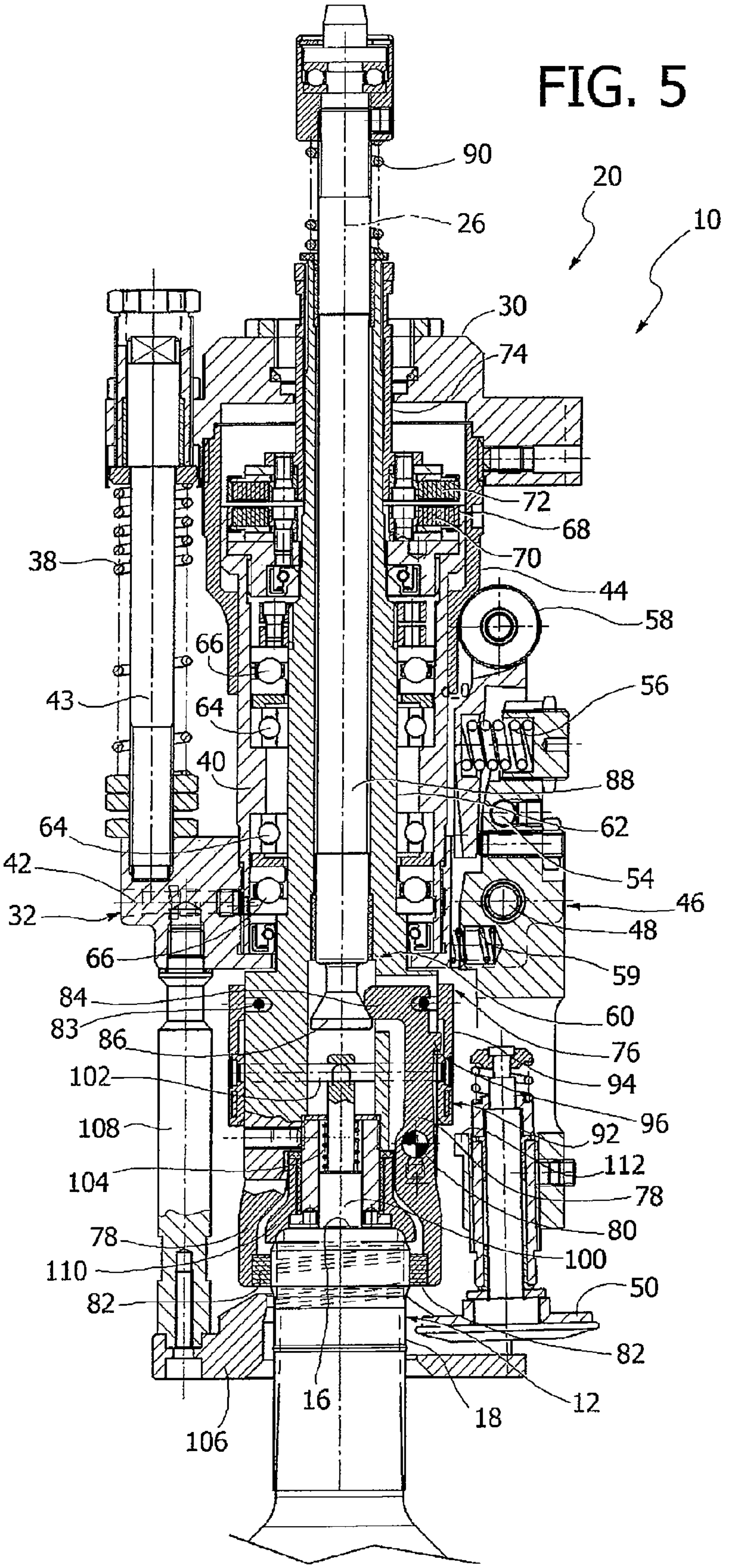

The travel downwards of the first support 20 has an amplitude greater than the travel of screwing. Consequently, once the step of screwing is completed, the movement downwards of the tubular shaft 62 and of the second support 32 is interrupted, whilst the movement downwards of the first support 20 continues. In this way, the second springs 38 are compressed, which apply a force of greater intensity on the second support 32. Once the movement of screwing is completed, the magnetic clutch 68 starts to slip so that the tubular shaft 62 and the gripper 76 remain stationary, whilst the second support 32 turns about the tubular shaft 62. In this step (illustrated in FIG. 5), the gripper 76 is stationary with respect to the cap 12 and is pushed downwards with a force of high intensity. This force compresses the deformable gasket situated within the cap 12 against the top rim of the container.

In the next step, the rolling process starts. Whilst the cap 12 is completely screwed and pushed downwards with the force of high intensity, the further movement downwards of the first support 20 controls, via the cam 44, oscillation of the arms 46, which bring the rolling wheels into contact with the external wall of the cap 12. The further helical motion downwards of the first support 20 produces a movement of pure rotation of the second support 32, whilst the rolling wheels 50 are pressed elastically against the external edge of the cap 12. Rotation of the rolling wheels 50 about the cap 12 produces a plastic deformation of the cap within a corresponding annular collar provided on the container at the base of the thread.

At the end of the rolling step, the first support 20 displaces upwards, and the head 10 is brought back automatically into the initial position of FIG. 2.

In the absence of the cap 12 on the container 14, the safety device 92 associated to the gripper 76 prevents, in addition to closing of the gripper 76, also the movement of rolling. With reference to FIG. 2, when the ring 94 of the safety device 92 is in the lowered position, a protuberance 112 of the arm 46 rests on the external surface of the ring 94 in the case where said ring has not been raised by the feeler pin 100. With reference to FIGS. 3 to 6, when the ring 94 is in the raised position, the protuberance 112 does not interfere with the ring 94, and the arm 46 can displace into the position of rolling. In this way, the risk of breaking or damaging the container by carrying out rolling directly on the container 14 in the absence of the cap 12 is avoided.

At the end of the rolling step, this type of head enables a subsequent final step of screwing of the cap. Furthermore, since opening and closing of the head are controlled, it is possible to carry out the rolling step with the gripper open, thus reducing further the possibility of causing damage to the serigraph present on the cap.

Of course, without prejudice to the principle of the invention, the details of construction and the embodiments may vary widely with respect to what is described and illustrated herein, without thereby departing from the scope of the present invention, as defined by the ensuing claims.

The invention claimed is:

1. A screwing and rolling head for the application of pre-threaded caps on containers, comprising:

a first support, designed to be moved with a helical motion made up of a rectilinear movement along a longitudinal axis and a movement of rotation about said axis;

a second support, which is mobile with respect to the first support in the direction of said longitudinal axis and is fixed in rotation with respect to the first support;

a device for screwing caps, fixed in an axial direction with respect to the second support and rotatable with respect to the second support;

a torque-limiter device, connected between the screwing device and the second support, in which the torque-limiter device renders the screwing device fixed in rotation with respect to the second support (32) below a pre-set threshold of torque and renders the screwing device rotatable with respect to the second support under the action of a torque higher than said pre-set threshold;

at least one oscillating arm, which carries a rolling element and is articulated to the second support about a transverse axis, said oscillating arm being displaceable between an operative position and an inoperative position and co-operating with a cam actuation member carried by the first support; and first elastic means for applying, between the first support and the second support, a relatively low axial force during a step of screwing of the caps, and second elastic means for applying a relatively high axial force between the first support and the second support during a rolling step, the device for screwing caps comprises a gripper, which is mobile between an open position and a closed position and is designed to grip a cap along a side wall thereof, the movements of opening and closing of the gripper being controlled by a control rod, which is mobile in an axial direction.

2. The head according to claim 1, wherein the gripper is associated to a safety device, designed to prevent closing of the gripper in the absence of a cap on a container.

3. The head according to claim 2, wherein said safety device prevents the displacement of said oscillating arm towards the operative position in the absence of a cap on a container.

4. The head according to claim 2, wherein said safety device comprises a ring, which is mobile in an axial direction between a lowered position and a raised position and is connected to a feeler pin, designed to rest against a top surface of a cap and to displace the ring towards the raised position when it comes into contact with a cap.

5. The head according to claim 4, wherein said ring has an annular groove, designed to receive external protuberances of the gripper in the raised position of the ring.

6. The head according to claim 4, wherein said oscillating arm has a protuberance, designed to rest against an external surface of the ring when the ring is in its lowered position.

7. The head according to claim 1, wherein the screwing device comprises a tubular shaft, articulated at one end of which is a plurality of rocker arms forming said gripper.

8. The head according to claim 7, wherein the control rod associated to the gripper is set coaxially within said tubular shaft.

9. The head according to claim 8, wherein the second support comprises a tubular sleeve and a radial flange, which extends in a radial direction outwards with respect to said tubular sleeve, the aforesaid tubular shaft of the device for screwing the caps being set coaxially within said tubular sleeve.

10. The head according to claim 9, wherein the first support comprises a radial flange, connected to said radial flange of the second support by means of a plurality of guide rods.

11. The head according to claim 10, wherein said first and second elastic means comprise helical compression springs, arranged coaxially with respect to said guide rods.

* * * * *